United States Patent
Aruga et al.

(10) Patent No.: US 6,292,736 B1
(45) Date of Patent: *Sep. 18, 2001

(54) VEHICLE CONTROL SYSTEM AND RECORDING MEDIA RECORDED WITH PROGRAMS FOR THE SYSTEM

(75) Inventors: Hideki Aruga, Anjo; Kunihiro Iwatsuki, Toyota; Takashi Ota, Toyota; Takeo Hamada, Toyota; Toshihiro Shiimado, Tokyo, all of (JP)

(73) Assignees: Aisin AW Co., Ltd., Anjo; Toyota Jidosha Kabushiki Kaisha, Toyota, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,000

(22) Filed: Aug. 6, 1998

(30) Foreign Application Priority Data

Aug. 8, 1997 (JP) .................................................... 9-214697

(51) Int. Cl.⁷ .............................. G06F 7/00; G06F 17/00

(52) U.S. Cl. .................................. 701/95; 701/51; 701/93; 701/207; 701/214; 477/154

(58) Field of Search ..................................... 701/93, 95, 207, 701/209, 201, 210, 214, 51, 25, 52, 216; 477/154; 340/988

(56) References Cited

U.S. PATENT DOCUMENTS

| | | | |
|---|---|---|---|
| 4,155,277 | * 5/1979 | Minami et al. . | |
| 4,966,049 | 10/1990 | Takahashi . | |
| 5,598,335 | 1/1997 | You . | |
| 5,748,472 | 5/1998 | Gruhle et al. . | |
| 5,864,771 | 1/1999 | Yokoyama et al. | 701/208 |
| 5,890,087 | 3/1999 | Ryoo . | |
| 5,893,894 | 4/1999 | Moroto et al. | 701/53 |
| 5,931,888 | * 8/1999 | Hiyokawa | 701/210 |
| 5,945,927 | * 8/1999 | Nakayama et al. | 701/210 |
| 5,948,042 | * 7/1999 | Heimann et al. | 701/210 |

FOREIGN PATENT DOCUMENTS

| | | |
|---|---|---|
| 59-140953 | 8/1984 | (JP) . |
| 61-262259 | 11/1986 | (JP) . |
| 62-2049 | 1/1987 | (JP) . |
| 4-15799 | 1/1992 | (JP) . |
| 5-262251 | 10/1993 | (JP) . |
| 6-147906 | 5/1994 | (JP) . |
| 7-11424 | 1/1995 | (JP) . |
| 7-85392 | 3/1995 | (JP) . |
| 7-306998 | 11/1995 | (JP) . |
| 8-72591 | 3/1996 | (JP) . |
| 8-159276 | 6/1996 | (JP) . |

* cited by examiner

Primary Examiner—William A. Cuchlinski, Jr.
Assistant Examiner—Gertrude Arthur
(74) Attorney, Agent, or Firm—Oliff & Berridge, PLC

(57) ABSTRACT

A vehicle control system comprising a vehicle speed sensor for detecting the speed of a vehicle; a road situation storage device for storing road structures and conditions; a recommended gear stage determining device for determining a recommended gear stage of an automatic transmission on the basis of the vehicle speed and the road structures and conditions; a present position detecting device for detecting the present position of the vehicle; a present position recognizing device for recognizing the present position of the vehicle, as detected by the present position detecting device; a control content selecting device for evaluating at least one of the present position detecting device and the present position recognizing device to select the control content on the basis of the evaluation result; and a speed change processing device for changing the speed in accordance with the control content selected by the control content selecting device.

3 Claims, 13 Drawing Sheets

| SENSOR | DECISION CONTENTS | EVALUATION INDEX |
|---|---|---|
| GPS | RECEIVING FOUR OR MORE ARTIFICIAL SATELLITES | 1 |
| | THREE-DIMENSIONAL LOCATION | 1 |
| | ALTITUDE AT 500 m OR LESS | 1 |
| | RECEIVING D-GPS INFORMATION AT COMMUNICATION UNIT | 1 |
| DISTANCE SENSOR | CORRECTED TRAVEL DISTANCE OF 500 m OR LESS | 1 |
| | VEHICLE SPEED OF 100 Km/h OR LOWER | 1 |
| GYRO SENSOR | DRIFT-CORRECTED ELAPSED TIME OF 10 MIN. OR LESS | 1 |

FIG. 5

| SENSOR | SUM OF EVALUATION INDICES | EVALUATIONS |
|---|---|---|
| GPS | 3 OR MORE | A |
| | 2 | B |
| | 1 OR LESS | C |
| DISTANCE SENSOR | 2 OR MORE | A |
| | 1 OR LESS | C |
| GYRO SENSOR | 1 | A |
| | 0 | C |

FIG. 6

VEHICLE CONTROL SYSTEM AND RECORDING MEDIA RECORDED WITH PROGRAMS FOR THE SYSTEM

BACKGROUND OF THE INVENTION

1. Field of Invention

The present invention relates to a vehicle control system and a recording medium recorded with programs for the system.

2. Description of Related Art

In a vehicle of the prior art having a navigation system mounted thereon, a guide route is calculated on the basis of the present position of the vehicle, as recognized by the navigation system, and a target set by the driver, so that the vehicle can be driven according to the guide route calculated. When the vehicle approaches a corner, a corner control is made so that the vehicle can turn around the corner at a lower speed gear stage. For this cornering, there is arranged a vehicle control system which calculates a recommended vehicle speed optimum for turning the corner on the basis of road data read out from data files and the present position detected by present position detecting means. Moreover, the vehicle control system compares the recommended vehicle speed and the present vehicle speed to issue a deceleration command, when the present position exceeds the recommended vehicle speed, thereby effect a downshift at the time of a predetermined operation, such as when the driver releases the accelerator or applies the brakes.

When there occurs errors between actual road structures and conditions and the road data stored in the road files, such as detection errors by present position detecting means or logical errors, the present position may not be accurately recognized.

Therefore, the vehicle control system recognizes that the guide route is missed, when a deviation between the recognized present position and the guide route becomes large, to inhibit the corner control.

In the vehicle control system of the related art, however, the corner control is effected for a small deviation. As a result, the position or timing for a downshift may become so different, as estimated from the actual road situations, as to give the driver a feeling of physical disorder.

SUMMARY OF THE INVENTION

The invention has been conceived to solve the above-specified problems of the vehicle control system of the related art and provides a vehicle control system, which is freed from giving the driver the feeling of physical disorder, and a recording medium which is storing programs for the system.

According to an aspect of the invention, there is provided a vehicle control system comprising: a vehicle speed sensor for detecting the speed of a vehicle; road structures and conditions storage means for storing road structures and conditions; recommended gear stage determining means for determining a recommended gear stage of an automatic transmission on the basis of the vehicle speed and the road structures and conditions; present position detecting means for detecting the present position of the vehicle; present position recognizing means for recognizing the present position of the vehicle, as detected by the present position detecting means; control content selecting means for evaluating at least one of the present position detecting means and the present position recognizing means to select the control content on the basis of the evaluation result; and speed change processing means for changing the speed in accordance with the control content selected by the control content selecting means.

In the vehicle control system, the control content selecting means includes evaluating means for evaluating at least one of the present position detecting means and the present position recognizing means on the basis of both the present position of the vehicle recognized by the present position recognizing means and the road structures and conditions read out from the road structures and conditions storage means.

Moreover, the control content to inhibit cornering control is set on the basis of the evaluation result by the evaluating means whereas an upper limit gear stage is set on the basis of the recommended gear stage determined by the recommended gear stage determining means, thereby to select the control content in which the upper limit gear stage is fed to the speed change processing means.

According to another aspect of the invention, there is provided a recording medium stored with programs: for determining a recommended gear stage of an automatic transmission on the basis of a vehicle speed and road structures and conditions; for detecting the present position of the vehicle; for recognizing the present position; for evaluating at least one of present position detecting means and present position recognizing means on the basis of the recognized present position and road structures and conditions; and for selecting control content on the basis of the evaluation result.

BRIEF DESCRIPTION OF THE DRAWINGS

The invention will be described in detail in connection with its embodiments with reference to the accompanying drawings.

FIG. 5 is a diagram illustrating a reliability decide table in the first embodiment of the invention;

FIG. 6 is a diagram exemplifying a reliability evaluation table in the first embodiment of the invention;

DETAILED DESCRIPTION OF PREFERRED EMBODIMENTS

Figure 1:
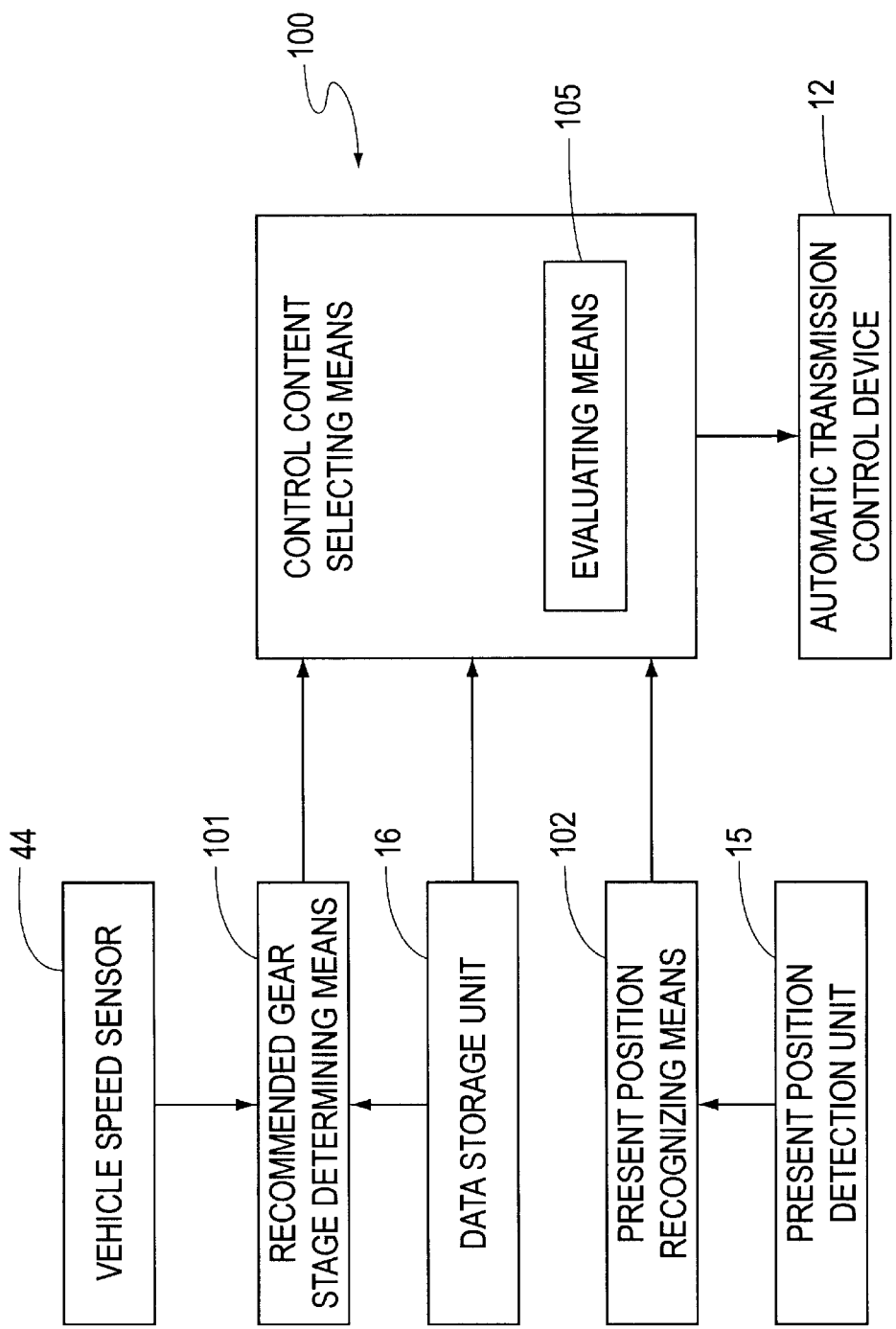
FIG. 1 is a block diagram showing the functions of a vehicle control system according to a first embodiment of the invention.

FIG. 1 is a block diagram showing the functions of a vehicle control system according to a first embodiment of the invention. An automatic transmission control device 12 acts as a shift means; a present position detection unit 15 acts as present position detecting means for detecting the present position; a data storage unit 16 acts as road structures and conditions storage means for storing the road structures and conditions; a vehicle speed sensor 44 is provided for detecting the vehicle speed; control content selecting means 100; recommended gear stage determining means 101 for determining the recommended gear stage for the automatic transmission on the basis of the vehicle speed and the road structures and conditions; present position recognizing means 102 for recognizing the present position detected by the present position detection unit 15; evaluation means 105 for evaluating at least one of the present position detection unit 15 and the present position recognizing means 102 on the basis of the present position recognized by the present position recognizing means 102 and the road structures and conditions read out from the data storage unit 16. The control content selecting means 100 evaluates at least one of the present position detection unit 15 and the present position recognizing means 102 to select the control content on the basis of the evaluation result.

Figure 2:
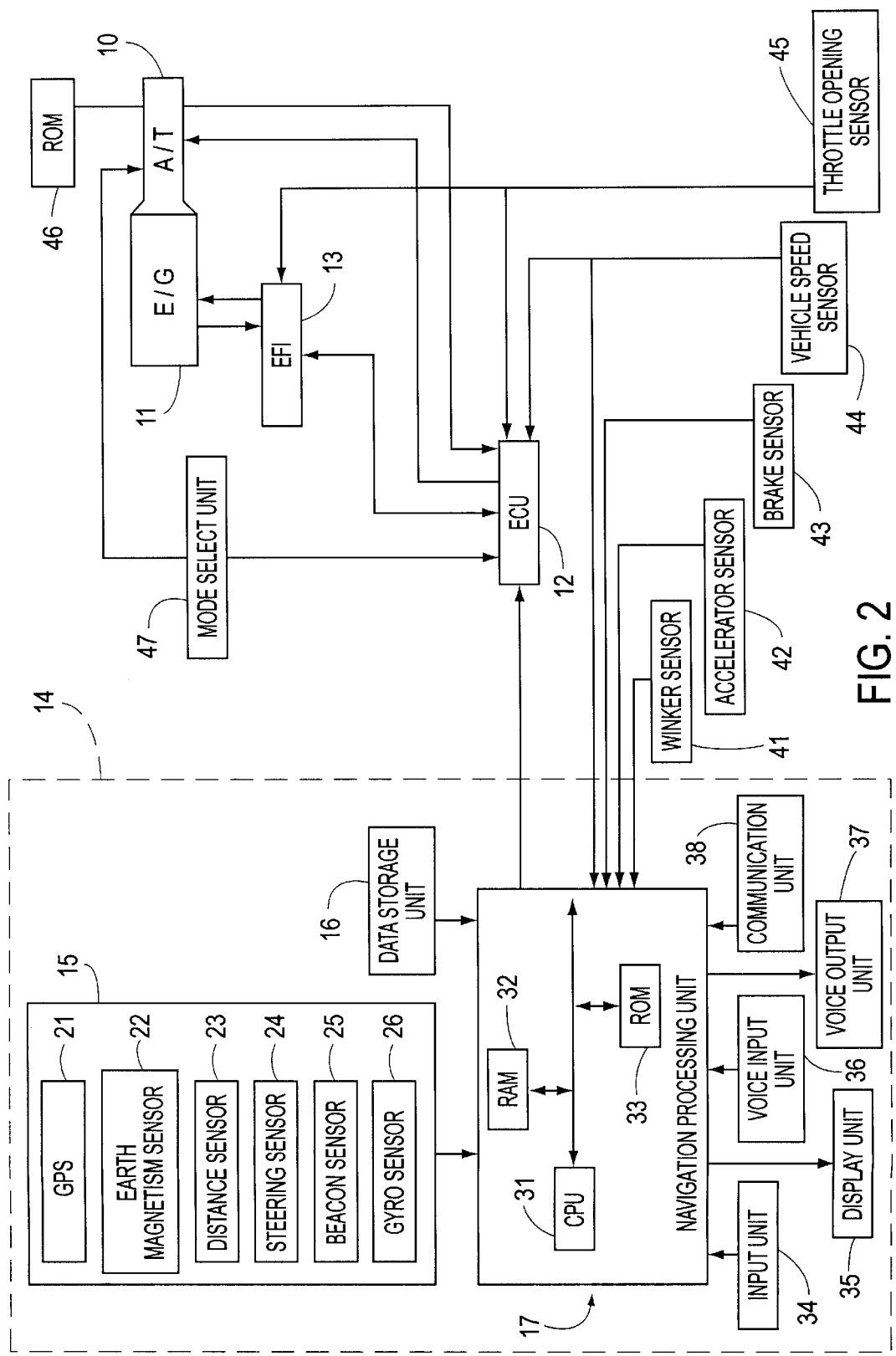
FIG. 2 is a schematic diagram showing the vehicle control system according to the first embodiment of the invention.
Figure 3:
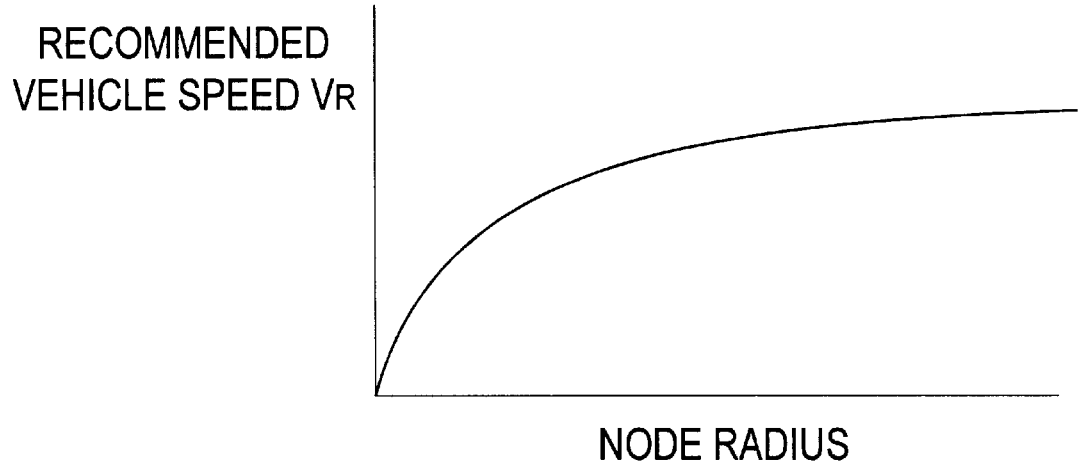
FIG. 3 is a diagram illustrating a recommended vehicle speed map in the first embodiment of the invention.
Figure 4:
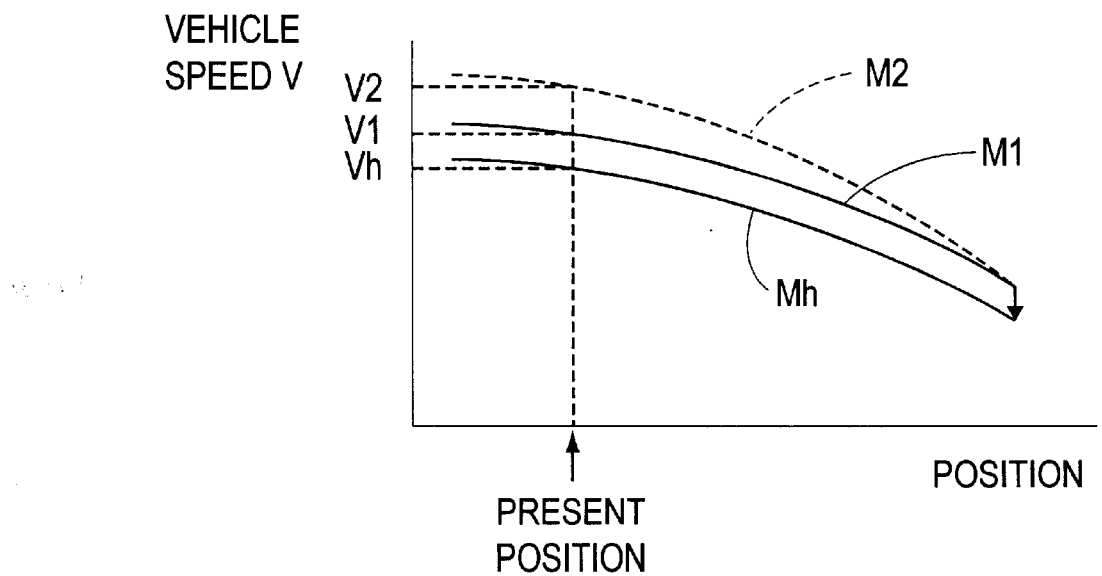
FIG. 4 is a diagram exemplifying a deceleration line map in the first embodiment of the invention.

FIG. 2 is a schematic diagram showing the vehicle control system according to the first embodiment of the invention; FIG. 3 is a diagram illustrating a recommended vehicle speed map in the first embodiment of the invention; FIG. 4 is a diagram exemplifying a deceleration line map in the first embodiment of the invention; FIG. 5 is a diagram illustrating a reliability decision table in the first embodiment of the invention; and FIG. 6 is a diagram exemplifying a reliability evaluation table in the first embodiment of the invention. In FIG. 3, the abscissa represents a node radius whereas the ordinate represents a recommended vehicle speed $V_R$. In FIG. 4, the abscissa represents the position of a vehicle whereas the ordinate represents a vehicle speed V.

FIG. 2 shows an automatic transmission (A/T) 10; an engine (E/G) 11; an automatic transmission control device (ECU) 12 that controls the entire automatic transmission 10; an engine control unit (EFI) 13 that controls the engine 11; and a navigation system 14.

Also shown are a winker sensor 41; an accelerator sensor 42 to detect the driver's operation of the driver with respect to the accelerator pedal; a brake sensor 43 for detecting the operation of the brake; a vehicle speed sensor 44; a throttle opening sensor 45; a ROM 46; and a mode selection unit 47 used to select between an ordinary mode and a navigation mode.

The navigation system 14 includes a present position detection unit 15, a data storage unit 16, a navigation processing unit 17 performs various operations such as providing navigation guidance on the basis of input information, an input unit 34, a display unit 35, a voice input unit 36, a voice output unit 37, and a communication unit 38.

Moreover, the present position detection unit 15 includes a Global Positioning System Sensor (GPS) 21, an earth magnetism sensor 22, a distance sensor 23, a steering sensor 24, a beacon sensor 25, a gyro sensor 26, an altimeter (not-shown), and other sensors for receiving position data as appropriate, so that it determines the present position of the vehicle using the data provided by these sensors.

The GPS sensor 21 detects the position of the vehicle on the earth by receiving signals transmitted by a plurality artificial of satellites normally at least three satellites; the earth magnetism sensor 22 detects the azimuth, in which the vehicle is directed, by metering the earth's magnetic field; and distance sensor 23 detects the distance between predetermined points on the road. The distance sensor 23 used, for example, is one that detects the distance based on detecting the RPM of the wheels or is one that measures acceleration and by integrating it twice determines the distance traveled.

The steering sensor 24 detects the steering angle. Examples of a steering sensor 24 that can be used are an optical rotation sensor attached to the turning portion of a handle (not-shown) or an angular sensor attached to a rotary resistor or a wheel.

The beacon sensor 25 detects the position of the vehicle by receiving positional information from the beacons arranged along the road. The gyro sensor 26 detects the angular velocity of rotation of the vehicle and is exemplified by a gas rate gyro or a vibratory gyro. Thus, the azimuth, in which the vehicle is directed, can be detected by integrating the angular velocity of rotation, as detected by the gyro sensor 26.

Here, the GPS sensor 21 and the beacon sensor 25 can detect the position of the vehicle independently of each other. In the case of the distance sensor 23, however, the position of the vehicle can be determined by combining the distance detected by the distance sensor 23 and the azimuth which is detected by the earth magnetism sensor 22 and the gyro sensor 26. The position of the vehicle can also be determined by combining the distance detected by the distance sensor 23 and the steering angle detected by the steering sensor 24.

Moreover, the data storage unit 16 contains a map data file, an intersection data file, a node data file, a road data file, a photograph data file, and other data files containing information about defined areas, such as hotels, gas stations and sightseeing guides located in the areas. Data files are stored with not only the data for searching the route but also data for displaying on the screen of the display unit 35 guide maps along the searched route, photographs or frame maps for intersections or along the route, distance to a next intersection or the direction to be taken at the next intersection, and other guide information. The data storage unit 16 further contains stored various data for activating the voice output unit 37 to output the predetermined information.

Specifically, the intersection data file contains intersection data for the individual intersections; the node data file contains node data for the nodes; and the road data file contains road data for the individual roads. The intersection data, node data and road data define the road structures and conditions. The node data are composed of elements indicating the position and the shape of the individual roads of the map data and include data indicating the individual nodes and the links (or lines) joining the nodes. Moreover, the road data indicate the width, the gradient, the cant, the bank, the surface state, the lane number, the lane number reducing point, the width narrowing point and other pertinent data describing the roads; the radii of curvature, the intersections, the T roads, the entrances and other data for defining the corners; and the railroad crossings, the ramps at the exits of highways, the toll gates on the highways, uphills, downhills, the class of each road (national or ordinary roads, highways and so on) and other data for defining the road attributes.

The navigation processing unit 17 includes a CPU 31 for controlling the navigation system 14; a RAM 32 used as a working memory for the CPU 31 to perform the various operations; and a ROM 33 used as a recording medium that stores various programs for searching the route to a destination, for providing guidance along the roads on the route and for determining a specific section. The navigation processing unit 17 is electronicallly connected to the input unit 34, the display unit 35, the voice input unit 36, the voice output unit 37 and the communication unit 38. The ROM 33 is made of a magnetic core (not-shown), semiconductor memory or the like as known to those skilled in the art.

Here, the aforementioned data storage unit 16 and ROM 33 can be replaced by a variety of recording media, such as magnetic tape, magnetic disk, floppy disk, magnetic drum, CD, MD, optical disk, IC card or optical card.

In this embodiment, the ROM 33 stores the necessary programs, and another memory, or the data storage unit 16 stores the necessary data. However, the programs and data can be stored in a common external recording medium. In this modification, for example, the navigation processing unit 17 can be equipped with a flash memory (not-shown) so that the programs and data can be read out from the external recording medium and written into the flash memory. Then, the programs and data can be updated by replacing the external recording medium. In addition, the control programs, or the like, for the automatic transmission control device 12 can be stored together in the external recording medium. Thus, the necessary programs, as stored in the various recording media, can be started to perform the required operations on the basis of the data.

In addition, the communication unit 38 is provided for transmitting/receiving the various data with an FM transmitter or over the telephone lines. The communication unit 38 receives data, such as traffic jam or accident information, as provided by information center (not-shown) or the like, or D-GPS information provided as the detection error of the GPS sensor 21. Here, the programs and data for realizing the functions of the invention could be received at least partially by the communication unit 38 and stored in the flash memory or other provided memory or storage area.

Moreover, the input unit 34 is provided for correcting the position at the start of a drive and for inputting a destination. The input unit 34 can use a keyboard, a mouse, a bar code reader, a write pen or a remote control unit arranged separately of the display unit 35. Alternatively here, the input unit 34 is a touch panel which is enabled to provide input by touching a key or menu displayed on the image of the display unit 35.

The display unit 35, moreover, displays an operation guide, an operation menu, a guide to the operation keys, a route to the destination, a guide along the route to be followed, and other appropriate displays. The display unit 35 can be a CRT display, a liquid crystal display, a plasma display, a hologram device for projecting a hologram on the windshield, or any other device that allows rapid assimilation of the displayed data by a driver or vehicle occupant.

The voice input unit 36 is made of a microphone (not-shown) or other sound input device that enables input of necessary information through the voice. The voice output unit 37 is equipped with a voice synthesizer or speaker (not-shown) so that the guide information is audibly output from the speaker. Here, in addition to the voice thus synthesized, the guide information can also be recorded on a tape so that it can be outputted from the speaker at a later time after development.

In the vehicular control system thus structured, the automatic transmission control device 12 makes the speed changes for an upshift or downshift in accordance with the control programs stored in the ROM 46.

When the driver operates the mode selection unit 47 to select the ordinary mode, the automatic transmission control device 12 refers to a shift map (not shown) in the ROM 46 using the vehicle speed V, as detected by the vehicle speed sensor 44, and the throttle opening, as detected by the throttle opening sensor 45, to select a gear stage corresponding to the vehicle speed V and the throttle opening.

When the driver operates the mode selection unit 47 to select the navigation mode, the navigation processing unit 17 restricts the gear stage if the predetermined conditions are so satisfied that the predetermined road situations are read out from the data storage unit 16 and that the not-shown accelerator pedal is released. Then, the automatic transmission control device 12 changes the speed at the restricted upper limit gear stage. Here, the operations similar to those at the time when the navigation mode is selected could also be performed at all times by the navigation processing unit 17.

The actions of the navigation processing unit 17 at the time when the navigation mode is selected will now be described.

First of all, when the vehicle comes to a corner, the CPU 31 starts the corner control. In the corner control, for the recommended gear stage determining means 101 (FIG. 1) of the CPU 31 to determine at first the optimum recommended gear stage for turning a corner, the CPU 31 determines the road structures and conditions. When the present position is detected by the present position detection unit 15 and recognized by the present position recognizing means 102, the CPU 31 calculates the radius of curvature of a road including the recognized present position, i.e., the node radius for each node within a predetermined range (for example, 1 to 2 Km from the present position on the road. Here, the route from the present position to the destination could also be searched, if necessary, to calculate the node radius for all of the nodes on the searched route. In this case, the node radius can be calculated by performing the operations on the basis of the absolute coordinates of the individual nodes and the individual absolute coordinates of two nodes adjoining the nodes in accordance with the road data. Alternatively, the data storage unit 16 could have stored there the node radii as part of the road data for the individual nodes so that the node radii might be read out as the vehicle runs along the identified route.

Next, the CPU 31 starts the corner control, if a node having a smaller radius than a threshold value is detected within a predetermined range from the present position of the vehicle, the CPU 21 reads a recommended vehicle speed $V_R$ corresponding to the node radius by referencing a recommended vehicle speed map, such as shown in FIG. 3. In the recommended vehicle speed map, the recommended vehicle speed $V_R$ is lower for a smaller node radius and higher for a larger node radius. Next, the CPU 31 calculates the gradients of the roads from the present position to the individual nodes.

In this embodiment, when the vehicle comes to a corner, it is determined what deceleration of the vehicle speed V is necessary to reach the recommended vehicle speed $V_R$ by the time the vehicle goes from the present position to the position of the corner. When one or more of the individual nodes within the predetermined range from the present position is identified as a node having a radius smaller than the threshold value, the recommended vehicle speed $V_R$ is calculated and used to determine a recommended gear stage.

Subsequently, the CPU 31 sets, for each specific node a decelerating acceleration reference value $\alpha$ indicating a threshold value deemed desirable for keeping the present gear stage; a decelerating acceleration reference value $\beta1$ indicating a threshold value deemed desirable for setting the gear stage to a third or lower speed, if the decelerating acceleration (or the rate of deceleration) is higher; and a decelerating acceleration reference value $\beta2$ indicating a threshold value deemed desirable for setting the gear stage to a second or lower speed if the decelerating acceleration is even higher.

The individual decelerating acceleration reference values, $\beta1$ and $\beta2$ are set by also considering the gradients of the road. It is necessary to do so because the decelerating accelerations are different for running over a flat and or an uphill or downhill distance. When the driver has an intention to decelerate the vehicle on an uphill, for example, a sufficient deceleration can many times be achieved without a positive speed change for the downshift.

It is also possible to set a plurality of individual decelerating acceleration reference values $\alpha$, $\beta1$ and $\beta2$ based on the known gradients of the roads. Moreover, one set of decelerating acceleration reference values $\alpha$, $\beta1$ and $\beta2$ could be set in advance based on a flat road which are corrected according to the actual gradients calculated. Moreover, the total weight of the vehicle can be considered and calculated so that the individual decelerating acceleration reference values $\alpha$, $\beta1$ and $\beta2$ might be different when there is only one person in the vehicle and for example, four people. In this modification, the total vehicle weight could be calculated on the basis of the acceleration at the time when a specific output shaft torque is generated, for example.

Subsequently, the CPU 31 calculates the section distance L from the present position to each node; a hold controlling deceleration line $M_h$ for keeping the present vehicle speed $V_{now}$, on the basis of the recommended vehicle speed $V_R$ and the decelerating acceleration reference value $\alpha$; and shift allowance controlling deceleration lines $M_1$ and $M_2$ for allowing the downshift, on the basis of the section distance L, the recommended vehicle speed $V_R$ and the decelerating acceleration reference values $\beta1$ and $\beta2$. Here, the holding controlling deceleration line Mh is lower by 10 Km/h, for example, than the shift allowance controlling deceleration line $M_1$ in a manner to correspond to the shift allowance controlling deceleration line $M_1$. On the other hand, the hold controlling deceleration line $M_h$ could be displaced by a predetermined distance from the shift allowance controlling deceleration line $M_1$.

In this case, the shift allowance controlling deceleration lines $M_1$ and $M_2$ indicate the values of the vehicle speed V at which the vehicle can run through each node at the recommended vehicle speed $V_R$ when the decelerations are performed at the decelerating acceleration reference values $\beta1$ and $\beta2$ at the section distance L.

Subsequently, the recommended gear stage determining means 101 calculates the value $V_h$ of the hold controlling deceleration line $M_h$ corresponding to the present position, and the individual values $V_1$ and $V_2$ of the shift allowance controlling deceleration lines $M_1$ and $M_2$ corresponding to the present position, and reads the present vehicle speed $V_{now}$ to compare the vehicle speed $V_{now}$ with the foregoing values $V_h$, $V_1$ and $V_2$.

When the vehicle speed $V_{now}$ is at the value $V_h$ or higher, the recommended gear stage is determined to the 4th speed. When the vehicle speed $V_{now}$ is at the value $V_1$ or higher, on the other hand, the recommended gear stage is determined is the 3rd speed. When the vehicle speed $V_{now}$ is at the value $V_2$ or higher, moreover, the recommended gear stage is determined to be the 2nd speed. Here, the recommended gear stages are determined for a plurality of specific nodes, and its minimum value is selected.

Moreover, not only the hold controlling deceleration line $M_h$ and the shift allowance controlling deceleration lines $M_1$ and $M_2$ can be all calculated by the operations described but also the calculated results can be stored in the form of maps so that they can be read out by referring to the maps.

Subsequently, the control content selecting means 100 of the CPU 31 evaluates the reliability for each sensor of the present position detection unit 15 and selects the control content on the basis of the evaluation result.

Specifically, the control content selecting means 100 evaluates at first, the reliability of the present position recognizing means 102 on the basis of the matching standard indicating an index whether the route is missed, and evaluates whether the conditions for executing the corner control are held, on the basis of the evaluation result.

In this case, the matching standards are that the vehicle is not run 100 m or more while missing the route; that the vehicle is not turned by 50 degrees or more after the route was missed; and that a correlation value, as calculated in the matching operation by the present position recognizing means 102, is smaller than a set value. If a predetermined matching standard is not satisfied, the control content selecting means 100 decides that the conditions for executing the corner control are not held, but does not perform the corner control.

Here, in the matching operations, the present position detected by the present position detection unit 15 is employed as the estimated present position, on which the road having a high possibility for the vehicle to actually run, is determined as a candidate road and on which a position having a high possibility for the vehicle to actually run is determined as a candidate position. Moreover, the present position recognizing means 102 computes a correlation value, i.e., a value indicating a correlation between the estimated present position and each of the candidate roads and positions, and selects and decides those of the candidate roads and positions which take the least correlation value, and as the road and the present position having the highest probability for the vehicle to actually run (as disclosed in Unexamined Published Japanese Patent Applications Nos. 6-147906 and 7-11424).

The control content selecting means 100 reads in the present position, as detected by the present position detection unit 15 and recognized by the present position recognizing means, and reads out the guide route from the data storage unit 16 so that it compares the present position and the guide route to decide whether the route has been missed. Moreover, the control content selection means 100 reads the distance, as detected by the distance sensor 23, and calculates the turning angle on the basis of the node data.

Subsequently, the evaluation means 105 of the control content selecting means 100 decides the reliability of each of the sensors of the present position detection unit 15 with reference to the reliability decision table in the ROM 33, as shown in FIG. 5, and evaluates the reliability of each sensor with reference to the reliability evaluation table in the ROM 33, as shown in FIG. 6.

The evaluation index is set to 1 if the reliability of each sensor is high in the reliability decision table. For the GPS sensor 21, for example, the evaluation index is set to 1 if either the GPS sensor 21 receives four or more artificial satellites, if the GPS sensor 21 performs the three-dimensional location, if the altitude is at 500 m or less, or if the communication unit 38 receives the D-GPS information.

For the distance sensor 23, on the other hand, the evaluation index is set to 1 if the corrected travel distance of the vehicle is 500 m or less or if the vehicle speed V is at 100 Km/h or lower.

For the gyro sensor 26, moreover, the evaluation index is set to 1 if the elapsed time after the correction (as will be called the "drift-correction") of the detected value of the azimuth, in which the vehicle is directed, is 10 min. or less.

The control content selecting means 100 reads the evaluation index for each sensor, calculates the sum of the evaluation indices read in, and evaluates the reliability of each sensor in accordance with the sum.

For the GPS sensor 21, for example, the evaluation is set at A if the sum of the evaluation indices is 3 or more; at B if 2; and at C if 1 or less. For the distance sensor 23, on the other hand, the evaluation is set at A if the sum of the evaluation indices is 2 or more, and at C if 1 or less. For the gyro sensor 26, moreover, the evaluation is set at A if the sum of the evaluation indices is 1, and at C if 0.

When the reliabilities of the individual sensors are thus evaluated, the control content selecting means 100 inhibits the corner control by its corner control inhibit means (not-shown), if at least one sensor has the evaluation C, but causes the corner control by its upper limit gear stage set means (not-shown) if no sensor is sent to the evaluation C. Then, the CPU 31 starts the hold control. In this hold control, the present actual gear stage (hereinafter called the "actual gear stage") is held until the vehicle speed $V_{now}$ reaches the values $V_1$, and a higher gear stage is inhibited from being output.

Moreover, the control content selecting means 100 calculates the number of sensors having the evaluation A and selects the control contents of the corner control on the basis of the number of sensors of the evaluation A, so that the upper limit gear stage set means performs the corner control in accordance with the control contents selected.

In other words, the upper limit gear stage set means selects a first upper limit gear shift outputting operation if the number of sensors of the evaluation A is 1.

In this case, the upper limit gear stage set means detects the actual gear stage by the actual gear stage detecting means (not-shown). Moreover, the upper limit gear stage set means sets the value $_{SH}$ for setting the holding gear stage, i.e., the upper limit gear stage, to 3, if the actual gear stage is at 3rd speed or lower, and to 4 if the actual gear stage is at 3rd or higher. This can prevent the upper limit gear stage from getting higher than the actual gear stage.

When the value $S_H$ is thus determined, the upper limit gear stage set means determines the gear stage corresponding to the value $S_H$, as the upper limit gear stage, and outputs the upper limit gear stage to the automatic transmission control device 12. When this upper limit gear stage is output, moreover, the automatic transmission control device 12 performs the speed change at the upper limit gear stage.

In this case, the hold control is maintained to hold the actual gear stage, even when the present vehicle speed $V_{now}$ reaches the value $V_1$, thereby preventing a higher gear stage than the actual one from being output. When the node radius of the road exceeds the threshold value, moreover, the corner control is released to ordinary control.

When the number of sensors of the evaluation A is 2, the upper limit gear stage set means selects a second upper limit gear stage outputting operation. In this case, the hold control is maintained until the vehicle speed $V_{now}$ reaches the value $V_1$, and the shift allowance control is started when the vehicle speed $V_{now}$ reaches the value $V_1$.

Subsequently, the upper limit gear stage set means decides what of the 2nd, 3rd and 4th speeds the recommended gear stage determined by the recommended gear stage determining means 101 is at, and sets a value $S_S$ for determining the upper limit gear stage to 4 when the recommended gear stage is at the 4th speed. When the recommended gear stage is at the 3rd speed, the upper limit gear stage set means sets the value $S_S$ to 3, when the accelerator pedal (not-shown) is released to effect the accelerator ON→OFF or when the brake pedal (not-shown) is depressed to effect the brake OFF→ON. When the recommended gear stage is at the 2nd speed, the upper limit gear stage set means sets the value $S_S$ to 2, when the accelerator pedal is released to effect the accelerator ON→OFF or when the brake pedal is depressed to effect the brake OFF→ON. In this case, the accelerator ON→OFF means the state in which the depression of the accelerator pedal, as detected by the accelerator sensor, is reduced by 10% or more for a unit time period in which the accelerator sensor is OFF.

When the recommended gear stage is at the 3rd speed, the upper limit gear stage set means sets the value $S_S$ to 4, unless the accelerator registers ON→OFF and unless the brake registers OFF→ON. When the recommended gear stage at the 2nd speed, the upper limit gear stage set means sets the value $S_S$ to 3, unless the accelerator registers ON→OFF and unless the brake registers OFF→ON.

Subsequently, the upper limit gear stage set means decides whether the hold control is set. If the hold control is set, the upper limit gear stage set means detects the actual gear stage by the gear stage detecting means. Moreover, the upper limit gear stage set means sets the value $S_H$ for determining the upper limit gear stage to 3, if the actual gear stage is at the 3rd speed or lower, and to 4 if the actual gear stage is higher than the 3rd speed. Thus, the upper limit gear stage is prevented from getting higher than the actual gear stage. If the hold control is not set, the upper limit gear stage set means sets the value $S_H$ to 4.

When the values $S_S$ and $S_H$ are thus determined, the upper limit gear stage set means sets the gear stage corresponding to the lower one of the values $S_S$ and $S_H$, as the upper limit, and outputs this upper limit gear stage to the automatic transmission control device 12. When the upper limit gear stage is output, moreover, the automatic transmission control device 12 performs the speed change at the upper limit gear stage. When the node radius of the road exceeds the threshold value, the corner control is released to ordinary control.

When the number of sensors of the evaluation A is 3, the upper limit gear stage set means selects a third upper limit gear stage outputting operation. In this case, the hold control is maintained till the vehicle speed $V_{now}$ reaches the value $V_1$, and the shift allowance control is started when the vehicle speed $V_{now}$ reaches the value $V_1$.

Subsequently, the upper limit gear stage set means decides which of the 2nd, 3rd and 4th speeds the recommended gear stage is at as determined by the recommended gear stage determining means 101, and sets a value $S_S$ for determining the upper limit gear stage to 4, when the recommended gear stage is at the 4th speed. When the recommended gear stage is at the 3rd speed, the upper limit gear stage set means sets the value $S_S$ to 3, when the brake pedal is depressed to effect the brake OFF→ON. When the recommended gear stage is at the 2nd speed, the upper limit gear stage set means sets the value $S_S$ to 2, when the brake pedal is depressed to effect the brake OFF→ON.

Here, when the recommended gear stage at the 3rd speed, the upper limit gear stage set means sets the value $S_S$ to 4, unless the brake OFF→ON. When the recommended gear stage at the 2nd speed, the upper limit gear stage set means sets the value $S_S$ to 3, unless the brake OFF→ON.

Subsequently, the upper limit gear stage set means decides whether the hold control is set, and detects the actual gear stage by the gear stage detecting means if the hold control is set. Moreover, the upper limit gear stage set means sets the value $S_H$ for determining the upper limit gear stage to 3 if the actual gear stage is at the 3rd speed or lower, and to 4 if the actual gear stage is higher than the 3rd speed. Thus, the upper limit gear stage is prevented from getting higher than the actual gear stage. If the hold control is not set, the upper limit gear stage set means sets the value $S_H$ to 4.

When the values $S_S$ and $S_H$ are thus determined, the upper limit gear stage set means sets the gear stage corresponding to the lower one of the values $S_S$ and $S_H$, as the upper limit, and outputs this upper limit gear stage to the automatic transmission control device 12. Moreover, when the upper limit gear stage is output, the automatic transmission control device 12 performs the speed change at the upper limit gear stage. When the node radius of the road exceeds the threshold value, the corner control is released to ordinary control.

Thus, the reliability is evaluated for each sensor of the present position detection unit 15 so that the corner control is allowed if the reliability is high, but inhibited if the reliability is low. As a result, the corner control can be inhibited even if the deviation between the recognized present position and the guide route is small. As a result, the position and the timing for the downshift, for example, can be prevented from the position and the timing, as estimated from the actual road structures and conditions. This makes it possible to give no feeling of physical disorder as the corner control proceeds.

Here in this embodiment, the reliabilities of both the present position detection unit 15 and the present position recognizing means 102 are evaluated by the evaluation means 105. However, only one of the present position detection unit 15 and the present position recognizing means 102 could be evaluated.

Figure 7:
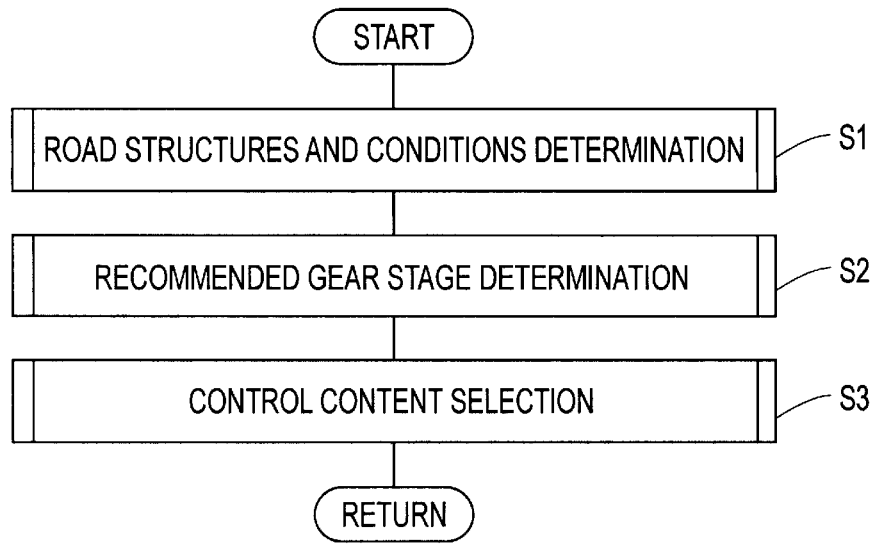
FIG. 7 is a flowchart showing the actions of a navigation processing unit in the first embodiment of the invention.

FIG. 7 is a flowchart showing the actions of a navigation processing unit in the first embodiment of the invention. In step S1, the road structures and conditions are determined and in step S2, a recommended gear stage is determined. In step S3, the control content is then selected.

Figure 8:
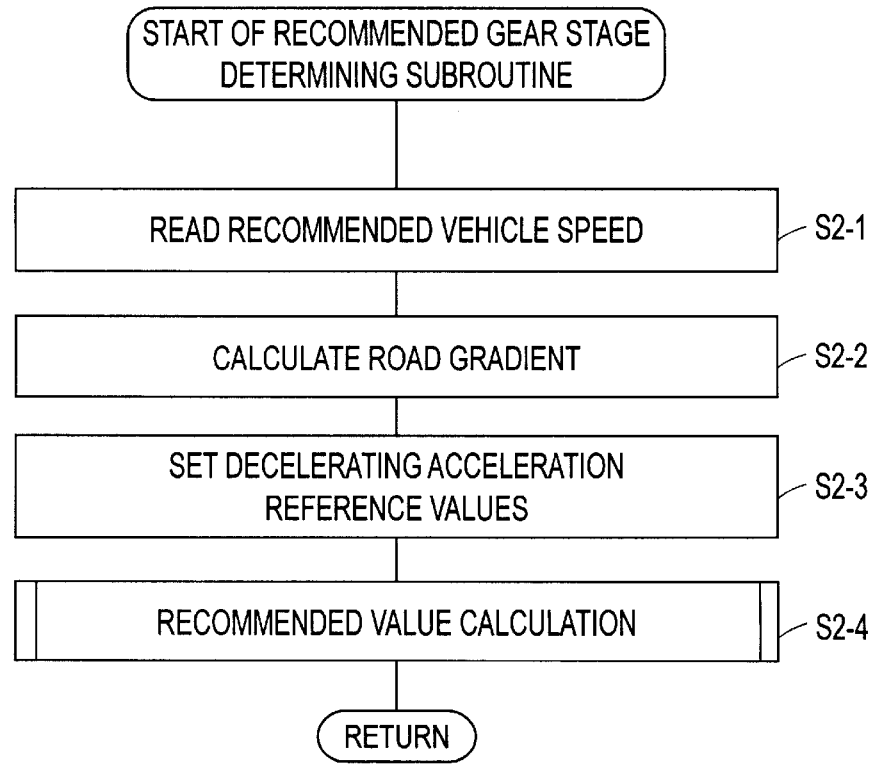
FIG. 8 is a flowchart showing a recommended gear stage determining subroutine in the first embodiment of the invention.

The recommended gear stage determining subroutine of step S2 of FIG. 7 is shown in FIG. 8.

In step S2-1, the recommended vehicle speed $V_R$ (FIG. 3) is read in, and in step S2-2, the gradient of the road from the present position to each node is calculated. Then in step S2-3, the decelerating acceleration reference values, β1 and β2 are set, and in step S2-4, the recommended deceleration acceleration values are calculated.

Figure 9:
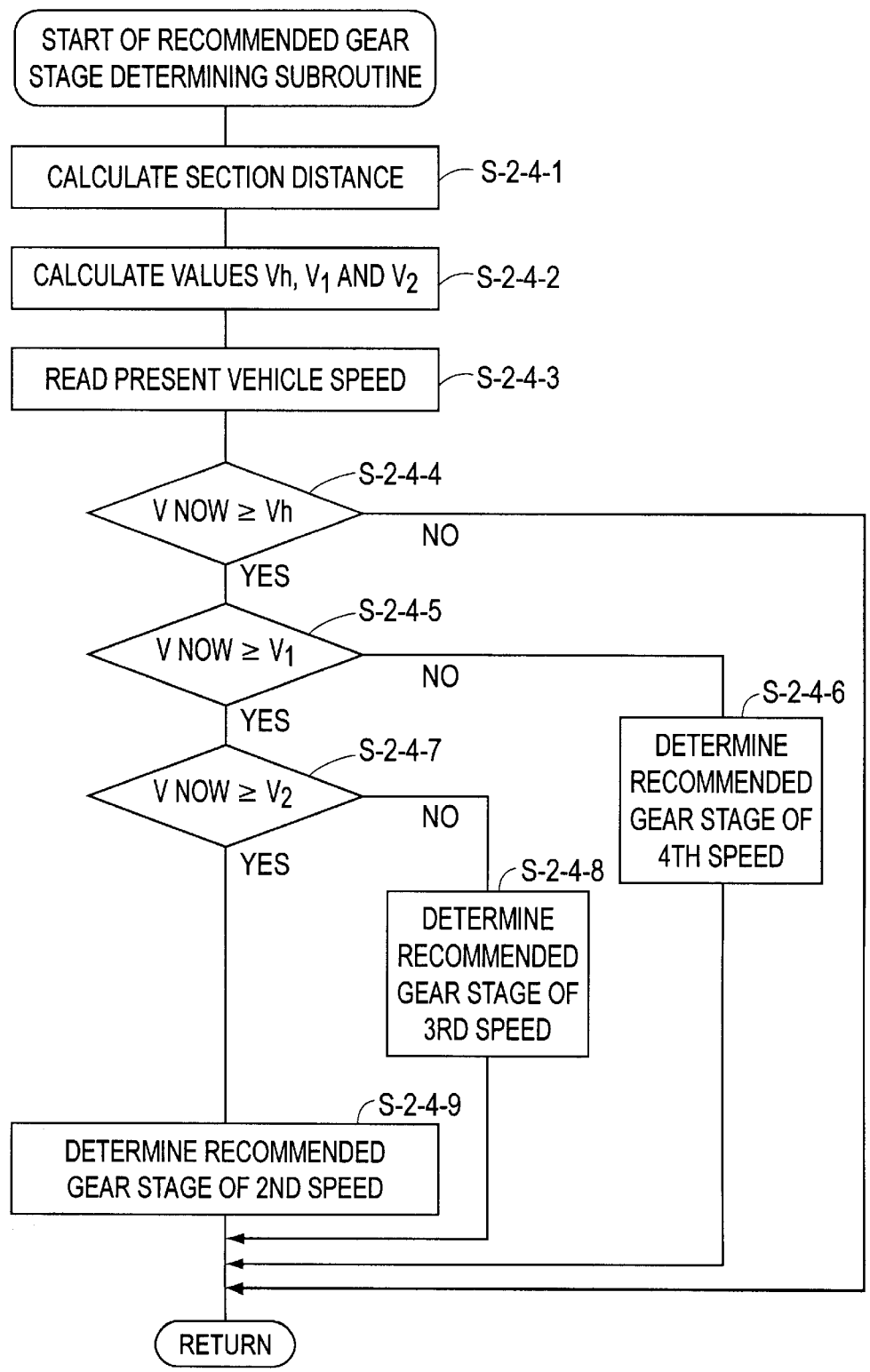
FIG. 9 is a flowchart showing a recommended value calculating subroutine in the first embodiment of the invention.

The recommended value calculating subroutine of step S2-4 of FIG. 8 is shown in FIG. 9. In step S2-4-1, the section distance L from the present position to each node is calculated. Then, in step S2-4-2, the values $V_h$ (FIG. 4), $V_1$ and $V_2$ are calculated. In step S2-4-3, the present vehicle speed $V_{now}$ is read in and in step S2-4-4, it is determined whether the vehicle speed $V_{now}$ is greater than or equal to the value $V_h$. If Yes, the subroutine goes to step S2-4-5 and if No, the subroutine is returned if the vehicle speed $V_{now}$ is lower than the value $V_h$.

In step S2-4-5; it is determined whether the vehicle speed $V_{now}$ is greater than or equal to the value $V_1$. If Yes, the subroutine advances to step S2-4-7, if No, to step S2-4-6. When the subroutine advances to step S2-4-6, the recommended gear stage is determined at the 4th speed.

In step S2-4-7, it is determined whether the vehicle speed $V_{now}$ is greater than or equal to the value $V_2$. If Yes, the subroutine advances to step S2-4-9, and if No, to step S2-4-8. Then the subroutine advances to step S2-4-8 and the recommended gear stage is determined at the 3rd speed.

In step S2-4-9, the recommended gear stage is determined at the 2nd speed.

Figure 10:
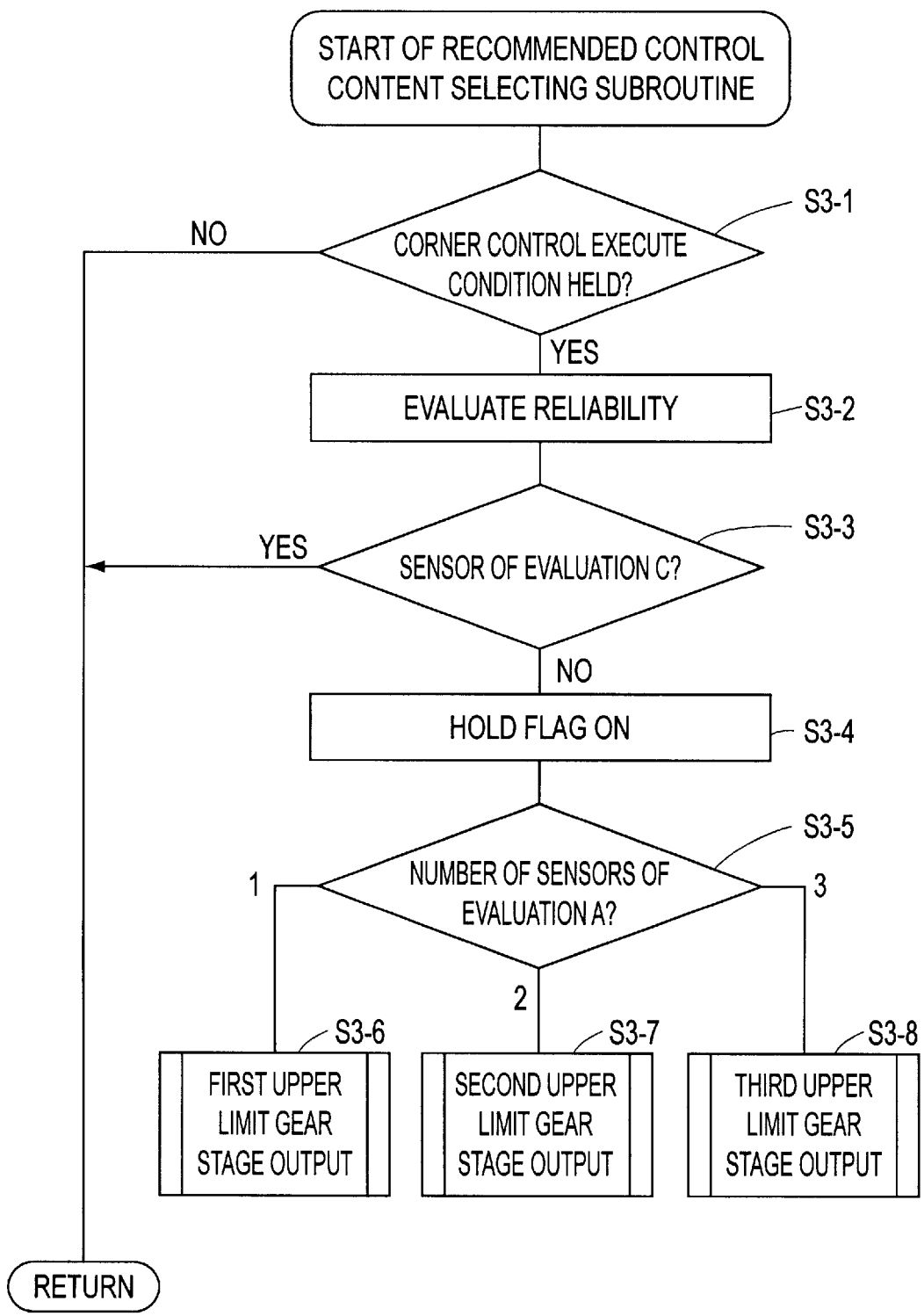
FIG. 10 is a flowchart showing a control content selecting subroutine in the first embodiment of the invention.

A control content selecting subroutine of step S3 of FIG. 7 will be described with reference to FIG. 10.

In step S3-1, it is decided on the basis of matching standards whether the conditions for executing the corner control are held. The subroutine then advances to step S3-2, if the corner control executing conditions are held, but otherwise is returned.

In step S3-2, the reliabilities of each sensor of the present position detection unit 15 is evaluated. Then in step S3-3, it is determined whether a sensor is set at the evaluation C. The subroutine is returned if a sensor is set at the evaluation C, but advances to step S3-4 if no sensor is set at the evaluation C. Then at step S3-4, a hold flag is turned ON.

In step S3-5, the number of sensors set to the evaluation A is determined. The subroutine advances to step S3-6 if the number of sensors set to the evaluation A is 1, to step S3-7, if the number of sensors is 2, and to step S3-8 if the number of sensors is 3. Then, in step S3-6, the first upper limit gear stage is output, in step S3-7, the second upper limit gear stage is output, and in step S3-8, the third upper limit gear stage is output.

Figure 11:
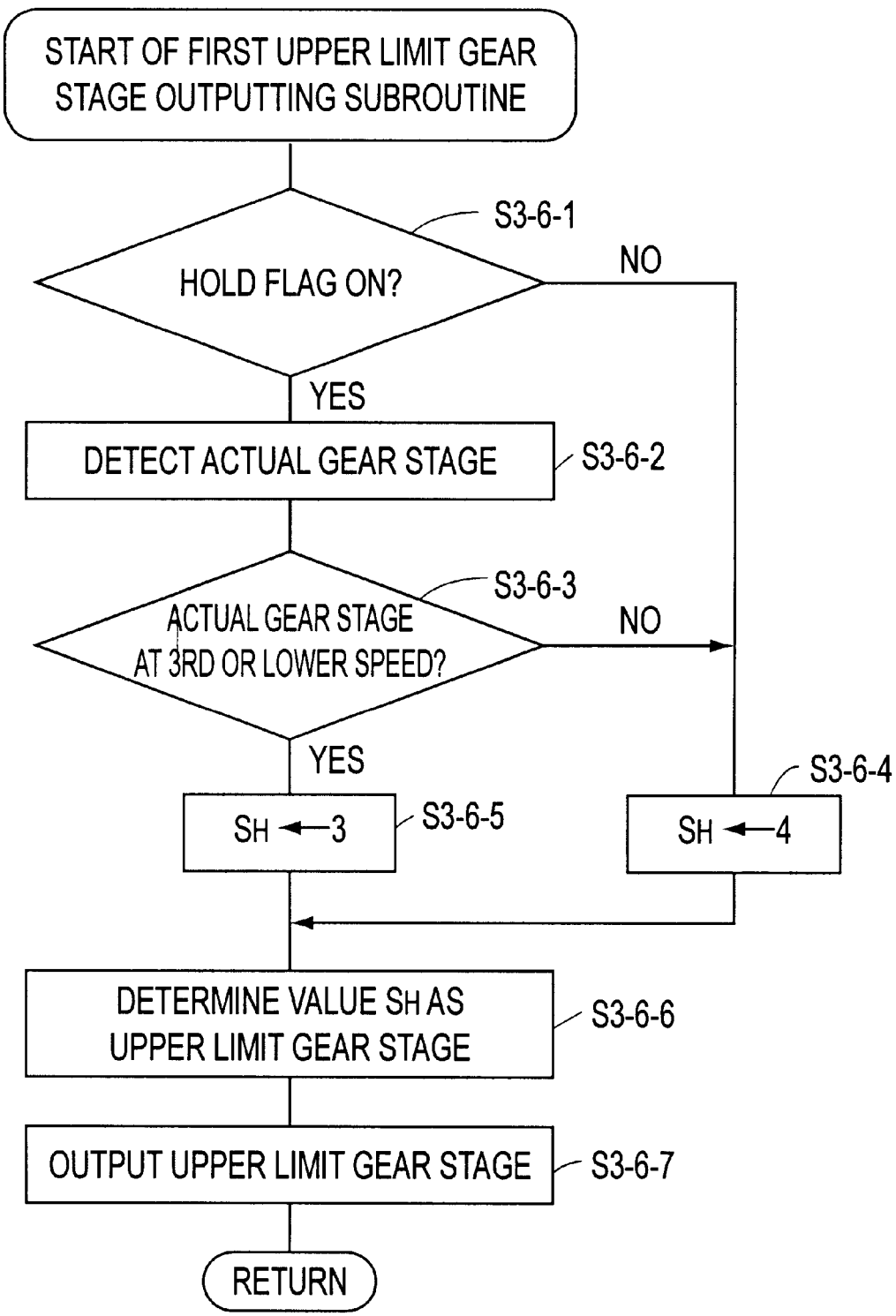
FIG. 11 is a flowchart showing a first upper limit gear stage outputting subroutine in the first embodiment of the invention.

The first upper limit gear stage outputting subroutine of step S3 of FIG. 10 will be described with reference to FIG. 11.

In step S3-6-1, it is determined whether the hold flag is ON. The subroutine advances to step S3-6-2, if the hold flag is ON, otherwise to step S3-6-4 if the hold flag is not ON.

In step S3-6-2, the actual gear stage is detected and in step S3-6-3, it is determined whether the actual gear stage is at the 3rd speed or lower. The subroutine advances to step S3-6-5, if the actual gear stage is at the 3rd speed or lower, and otherwise to step S3-6-4 if the actual gear stage is not at the 3rd speed or lower. Then, in step S3-6-4, the value $S_H$ is set to 4, in step S3-6-5, the value $S_H$ is set to 3, and in step S3-6-6, the value $S_H$ is determined as the upper limit gear stage. In step S3-6-7, the upper limit gear stage is output to the automatic transmission control device 12.

Figure 12:
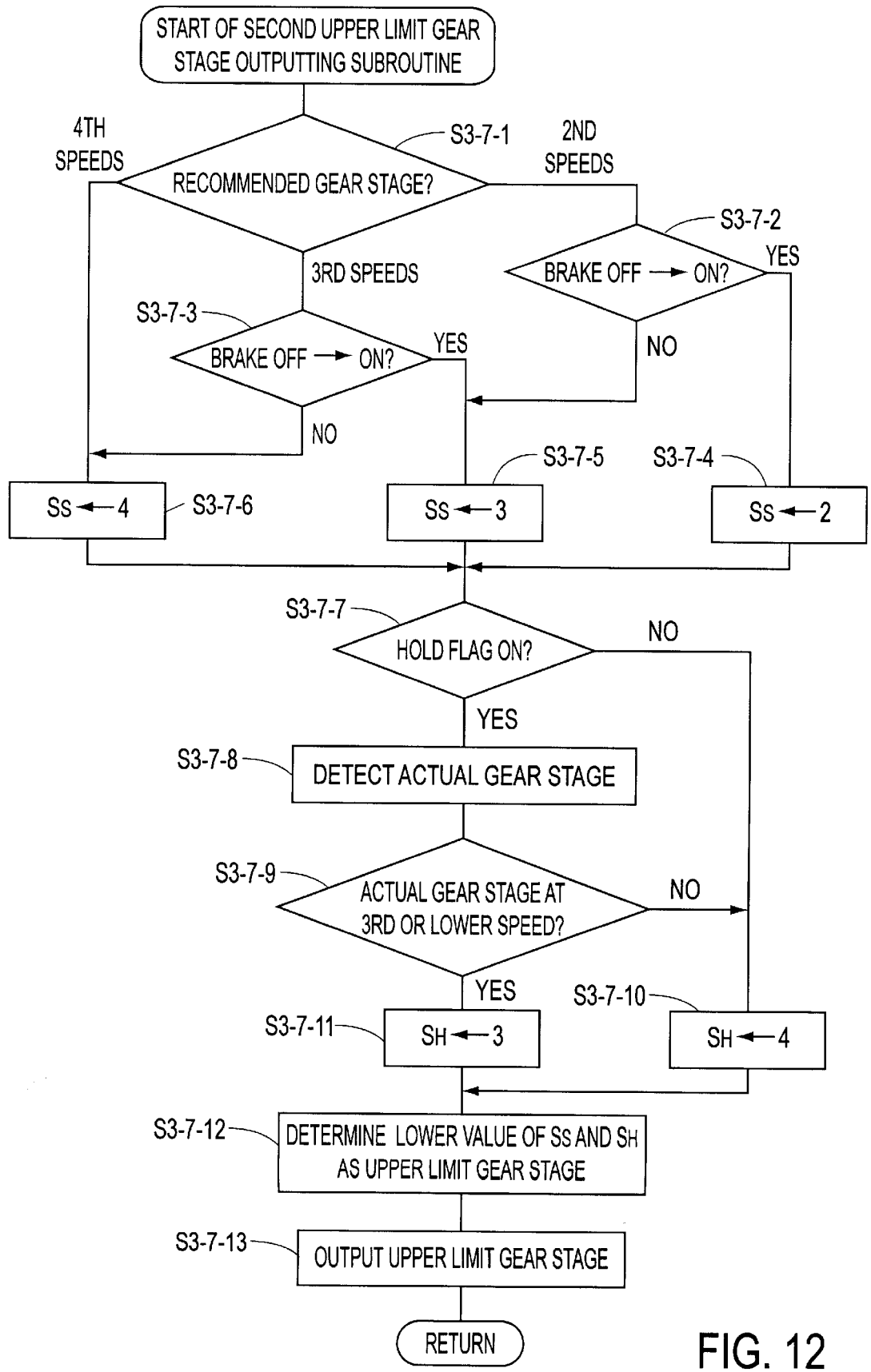
FIG. 12 is a flowchart showing a second upper limit gear stage outputting subroutine in the first embodiment of the invention.

The second upper limit gear stage outputting subroutine of step S3-7 of FIG. 10 will be described with reference to FIG. 12.

In step S3-7-1, it is determined which of the 2nd, 3rd and 4th speeds is the recommended gear stage determined by the recommended gear stage determining means 101 (FIG. 1). The subroutine advances to step S3-7-2 if the recommended gear stage is at the 2nd speed; to step S3-7-3 if the recommended gear stage is at the 3rd speed; and to step S3-7-6 if the recommended gear stage is at the 4th speed. At step S3-7-2, it is determined whether the accelerator ON→OFF or the brake OFF→ON. The subroutine advances to step S3-7-4, if the accelerator ON→OFF or the brake OFF→ON, but otherwise, goes to step S3-7-5.

In step S3-7-3, it is determined whether the accelerator ON→OFF or the brake OFF→ON. The subroutine advances to step S3-7-5, if the accelerator ON→OFF or the brake OFF→ON, but otherwise goes to step S3-7-6. In step S3-7-4, the value $S_S$ is set to 2; in step S3-7-5, the value $S_S$ is set to 3; and in step S3-7-6, the value $S_S$ is set to 4.

In step S3-7-7, it is determined whether the hold flag is ON. The subroutine advances to step S3-7-8, if the hold flag is ON, but otherwise to step S3-7-10 if the hold flag is not ON. In step S3-7-8, the actual gear stage is detected.

In step S3-7-9, it is determined whether the actual gear stage is at the 3rd speed or lower. The subroutine advances to step S3-7-11, where the value $S_H$ is set to 3 if the actual gear stage is at the 3rd speed or lower, but otherwise goes to step S3-7-10 where the value $S_H$ is set to 4.

In step S3-7-12, the lower one of the values $S_S$ and $S_H$ is determined as the upper limit gear stage and, in step S3-7-13, the upper limit gear stage is output to the automatic transmission control device 12.

Figure 13:
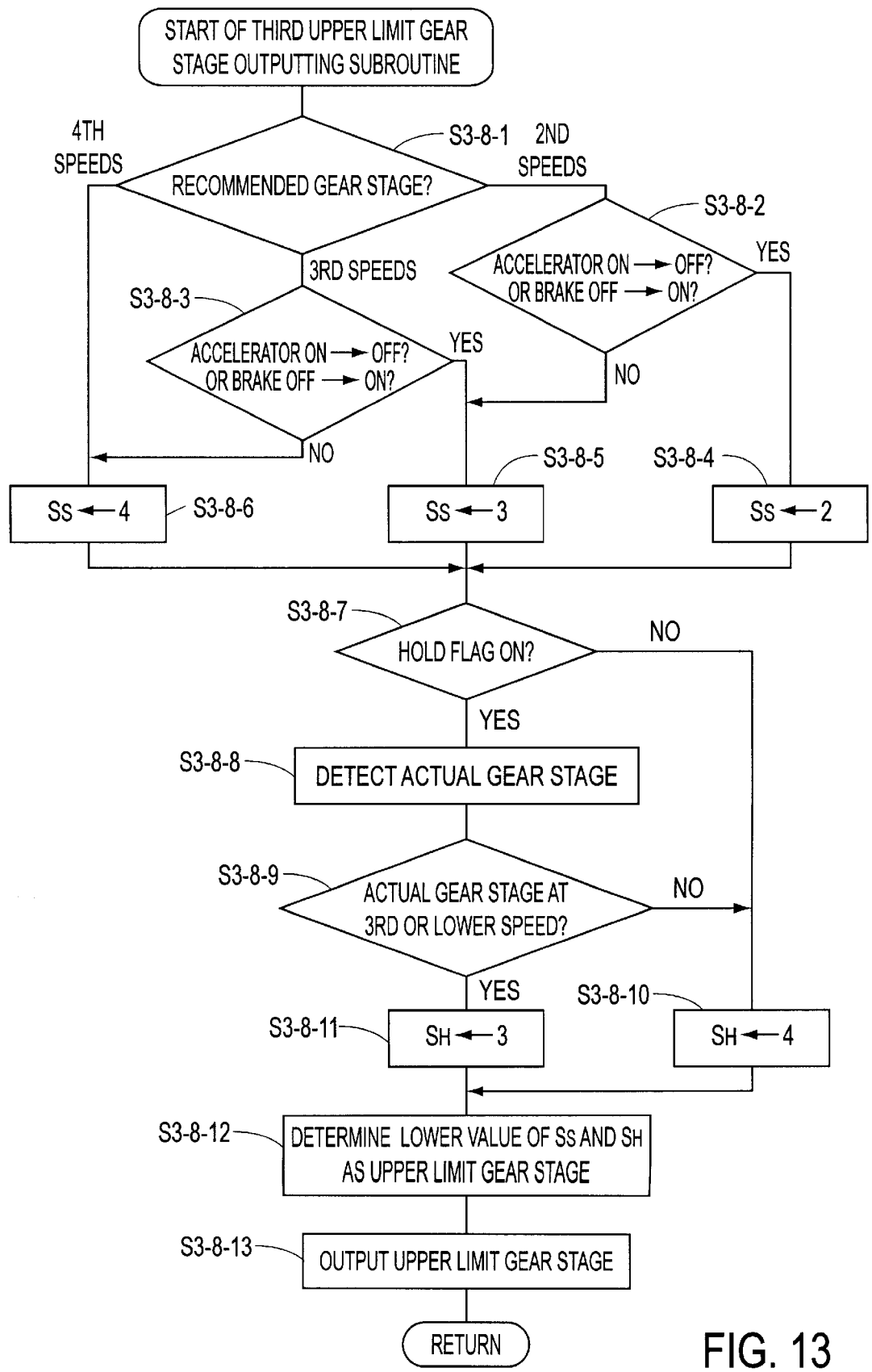
FIG. 13 is a flowchart showing a third upper limit gear stage outputting subroutine in the first embodiment of the invention.

The third upper limit gear stage outputting subroutine of step S3-8 of FIG. 10 will be described with reference to FIG. 13.

In step S3-8-1, it is determined which of the 2nd, 3rd and 4th speeds is the recommended gear stage determined by the recommended gear stage determining means 101 (FIG. 1). The subroutine advances to step S3-8-2, if the recommended gear stage is at the 2nd speed, to step S3-8-3, if the recommended gear stage is at the 3rd speed, and to step S3-8-6 if the recommended gear stage is at the 4th speed. At step S3-8-2, it is determined whether the brake OFF→ON. The subroutine advances to step S3-8-4, if the brake OFF→ON, but otherwise to step S3-8-5.

In step S3-8-3, it is determined whether the brake OFF→ON. The subroutine advances to step S3-8-5, if the brake OFF→ON, but otherwise to step S3-8-6. In step S3-8-4, the value $S_S$ is set to 2; in step S3-8-5, to 3; and in step S3-8-6, to 4.

In step S3-8-7, it is determined whether the hold flag is ON. The subroutine advances to step S3-8-8, if the hold flag is ON, but otherwise advances to step S3-8-10. In step S3-8-8: The actual gear stage is detected.

In step S3-8-9, it is determined whether the actual gear stage is at the 3rd speed or lower. The subroutine advances to step S3-8-11, if the actual gear stage is at the 3rd speed or lower, but otherwise to step S3-8-10. In step S3-8-10, the value $S_H$ is set to 4, whereas in step S3-8-11, the value $S_H$ is set to 3.

In step S3-8-12, the lower one of the values $S_S$ and $S_H$ is determined as the upper limit gear stage. In step S3-8-13, the upper limit gear stage is output to the automatic transmission control device 12.

Figure 14:
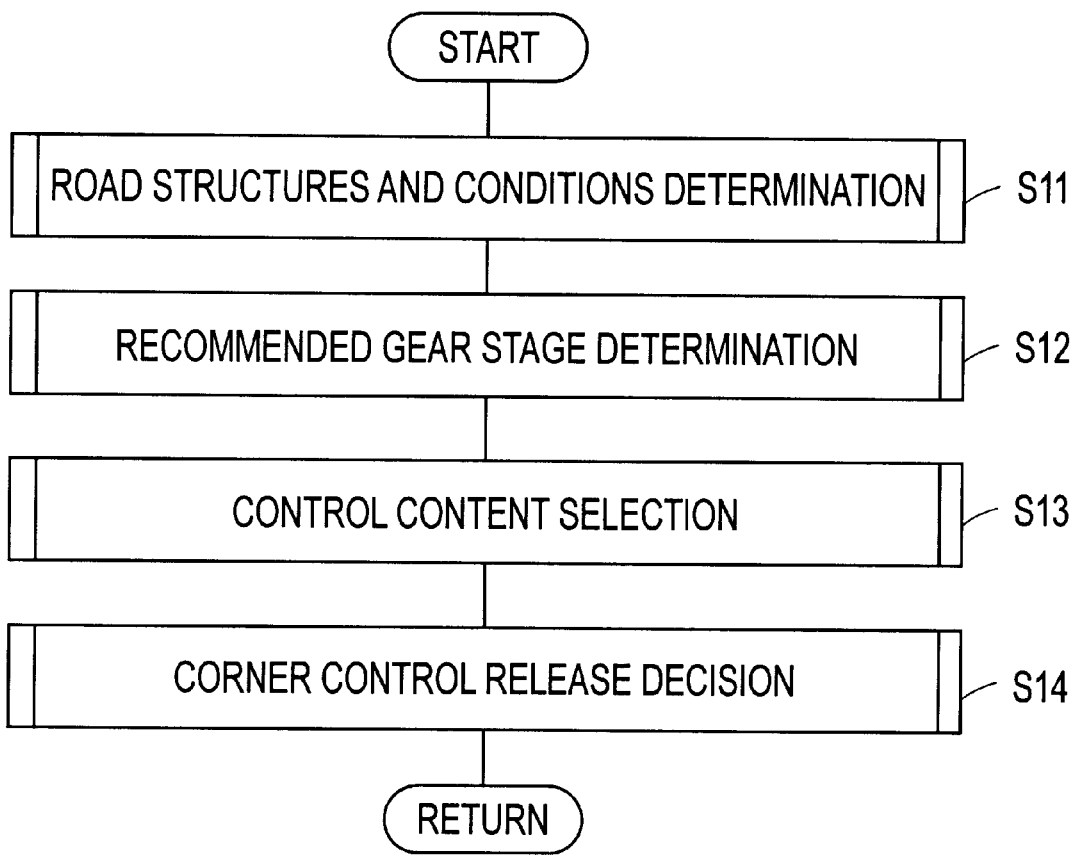
FIG. 14 is a flowchart showing the actions of a navigation processing unit in a second embodiment of the invention.

FIG. 14 is a flowchart showing the actions of a navigation processing unit in a second embodiment of the invention.

In this case, when a control content is selected by the control content selecting operation so that the corner control is performed according to the control content selected, the corner control release is determined by the CPU 31. When the corner control is released by the corner control release determination, an upshift is allowed. When the corner control is continued, the upper limit gear stage, as set in the control content selection, is maintained.

In step S11, the road structures and conditions are determined, and in step S12, the recommended gear stage is determined. Then, in step S13, the control content is selected, and in step S14, the corner control release is determined.

Figure 15:
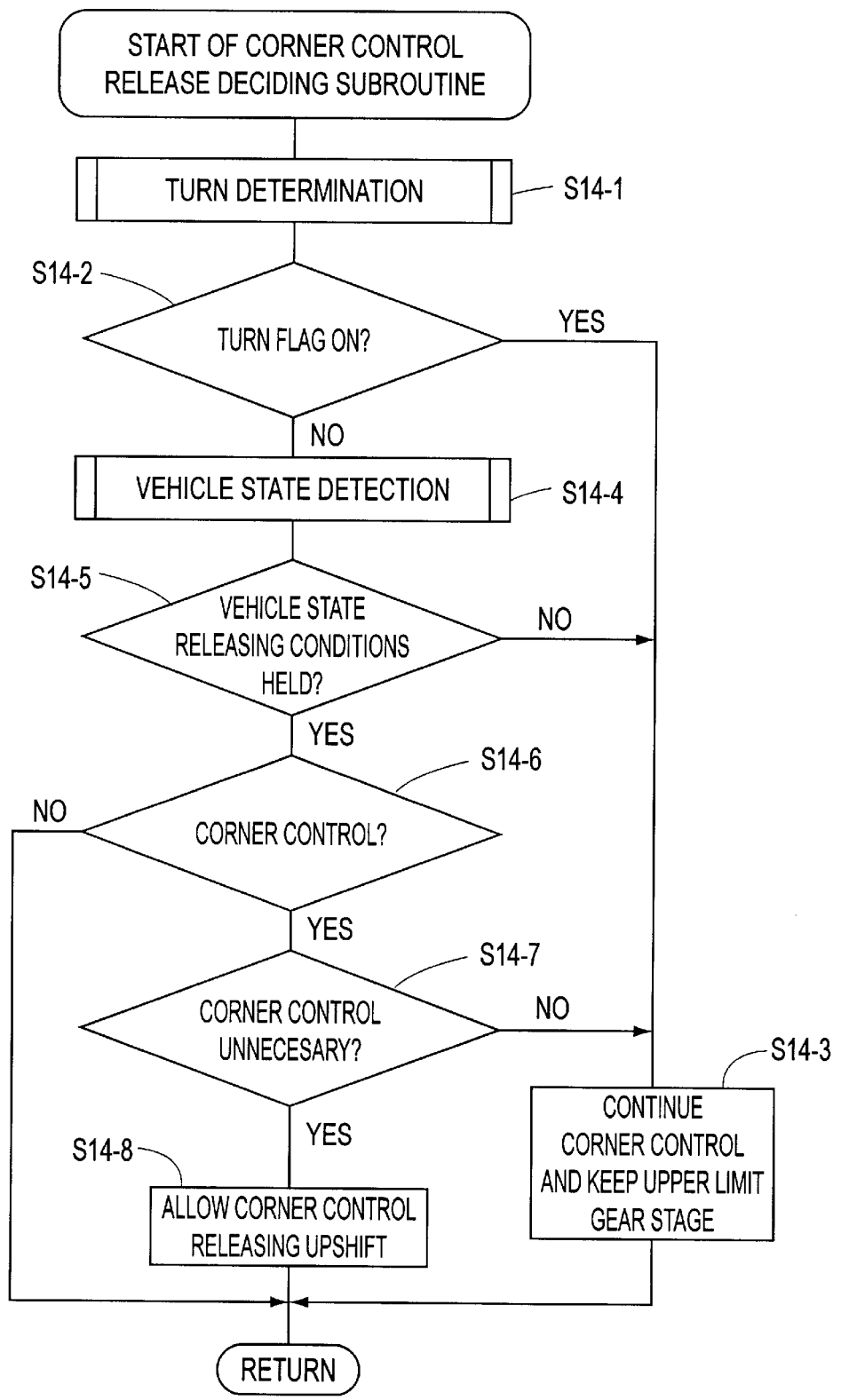
FIG. 15 is a flowchart showing a corner control release deciding subroutine in the second embodiment of the invention.

The corner control release determination subroutine of step S14 of FIG. 14 will be described with reference to FIG. 15.

In this case, the CPU 31 performs the turn determination to determine whether the vehicle is turning, that is, whether the turn flag is ON. If this turn flag is ON, the CPU 31 continues the corner control to maintain the upper limit gear stage which is set in the control content selection of step S13.

Next, the CPU 31 performs the vehicle state detection to detect the states of the vehicle other than whether the vehicle is turning, on the basis of the change in the depression of the accelerator pedal (not-shown), the change in the vehicle speed, etc., for example.

Moreover, the CPU 31 determines whether the vehicle state releasing conditions for releasing the corner control are held, on the basis of the vehicle states detected by the vehicle state detection. However, the CPU 31 continues the corner control, if the vehicle state release conditions are not held, to maintain the upper limit gear stage which is set in the control content selection.

The CPU 31 determines whether the corner control is being executed at present and whether the upper limit gear stage set in the control content selection is at the 4th speed, that is, whether the corner control is unnecessary. The upper limit gear stage, as set in the control content selection, is maintained, if the upper limit gear stage is at the 3rd speed or lower, but the corner control is released to allow the upshift if the upper limit gear stage is at the 4th speed.

In step S14-1, a turn is determined and in step S14-2, it is determined whether the turn flag is ON. The subroutine advances to step S14-3, if the turn flag is ON, but otherwise advances to step S14-4. In step S14-3, the corner control is continued to keep the upper limit gear stage, and in step S14-4, the vehicle state is detected.

In step S14-5, it is determined whether the vehicle state releasing conditions are held. The subroutine advances to step S14-6, if the vehicle state releasing conditions are held, but otherwise to step S14-3. In step S14-6, it is determined whether the corner control is occurring. The subroutine advances to step S14-7, if the corner control is made, but otherwise is returned. In step S14-7, it is determined whether the corner control is unnecessary. The subroutine advances to step S14-8, if the corner control is unnecessary, but otherwise to step S14-3. In step S14-8, the corner control is released to allow the upshift.

Figure 16:
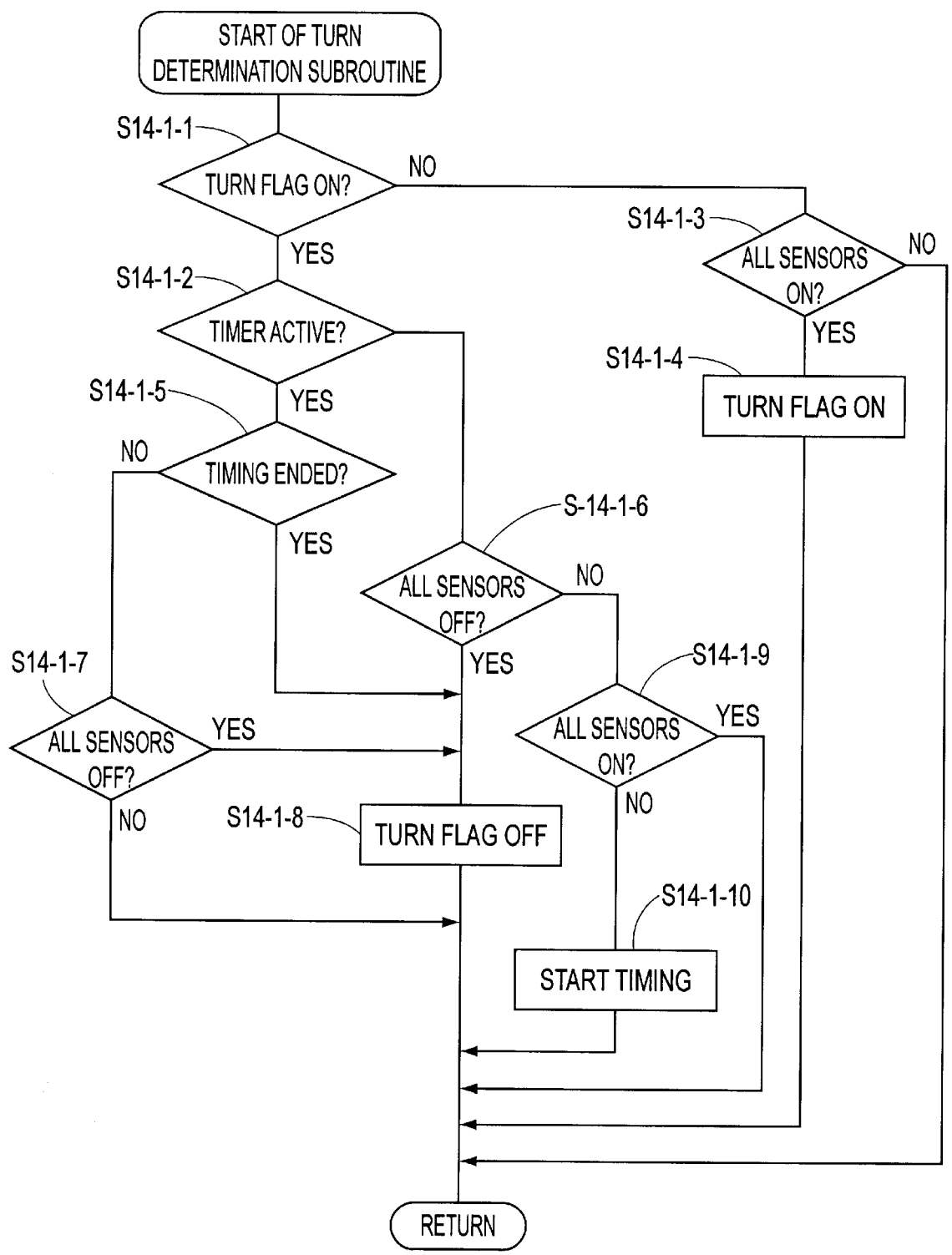
FIG. 16 is a flowchart showing a turn deciding subroutine in the second embodiment of the invention.

The turn deciding subroutine of step S14-1 of FIG. 15 will be described with reference to FIG. 16.

In this case, there are employed the steering sensor (FIG. 2); the gyro sensor 26; the right and left wheel sensors arranged at the right and left wheels; and a gyro sensor which is arranged separately of the foregoing gyro sensor 26 for controlling the vehicle stability to be effected at the turning time of the vehicle. On the basis of the detection results of the individual sensors, it is determined whether the vehicle turn has started and ended.

When any of the sensors is ON, for example, the CPU 31 determines that the vehicle turn has started, and turns ON the turn flag. When all the sensors are OFF, the CPU 31 determines that the vehicle turn has ended, and turns OFF the turn flag. When only a predetermined one of the sensors is ON, the CPU 31 starts the action of a timer and turns OFF the turn flag when the timing action of the timer is ended after lapse of a predetermined time period.

This makes it possible to find out an abnormality in the predetermined sensor when the timing action has ended after the lapse of the predetermined time period, thereby to cope with the abnormal sensor properly.

In step S14-1-1, it is determined whether the turn flag is ON. The subroutine advances to step S14-1-2, if the turn flag is ON, but otherwise advances to step S14-1-3. In step S14-1-2, it is determined whether the timer is active. The subroutine advances to step S14-1-5, if the timer is active, but otherwise advances to step S14-1-6.

In step S14-1-2, it is determined whether the timer is active. The subroutine advances to step S14-1-5, if the timer is active, but otherwise advances to step S14-1-6. In step S14-1-3, it is determined whether any sensor is ON. The subroutine advances to step S14-1-4, if any sensor is ON, but otherwise is returned. In step S14-1-4, the turn flag is turned ON.

In step S14-1-5, it is determined whether the timing has ended. The subroutine advances to step S14-1-8, if the timing has ended, but otherwise advances to step S14-1-7. In step S14-1-6, it is determined whether all of the sensors are OFF. The subroutine advances to step S14-1-8, if all of the sensors are OFF, but otherwise to step S14-1-9.

In step S14-1-7, it is determined whether or not all the sensors are OFF. The subroutine advances to step S14-1-8, if all the sensors are OFF, but otherwise is returned. In step S14-1-8, the turn flag is turned OFF.

In step S14-1-9, it is determined whether all the sensors are ON. The subroutine is returned, if all the sensors are ON, but otherwise advances to step S14-1-10. At step S14-1-10, the timing is started.

Here at step S14-1-3, it can be determined whether two or more sensors are ON. If two or more sensors are ON, the turn flag can be turned ON at step S14-1-4. Then, it is possible to ensure a turn determination.

At step S14-1-9, it is determined whether one sensor is ON. If one sensor is not ON, the timing can be started at step S14-1-10. Then, it is possible to determine that the continuously ON sensor is abnormal.

In the foregoing individual embodiments, if the conditions for executing the corner control are held after it has been determined on the basis of the matching standard whether the corner control executing conditions are held, the reliabilities of the individual sensors of the present position detection unit 15 are evaluated. It is, however, possible to simultaneously execute the determination of whether the executing conditions are held and the determination of reliabilities of the individual sensors.

Here, the invention should not be limited to those embodiments but could be modified in various manners on the basis of its gist, and these modifications should not be excluded from the scope of the invention.

According to the invention, as has been described in detail hereinbefore, the vehicle control system comprises the vehicle speed sensor for detecting the speed of the vehicle; the road structures and conditions storage means for storing the road structures and conditions; the recommended gear stage determining means for determining the recommended gear stage of the automatic transmission on the basis of the vehicle speed and the road structures and conditions; the present position detecting means for detecting the present position of the vehicle; the present position recognizing means for recognizing the present position of the vehicle, as detected by the present position detecting means; the control content selecting means for evaluating at least one of the present position detecting means and the present position recognizing means to select the control content on the basis of the evaluation result; and the speed change processing means for changing the speed in accordance with the control content selected by the control content selecting means.

In this case, at least one of the present position detecting means and the present position recognizing means is evaluated so that the control content is selected to match the reliability. Therefore, when the deviation between the recognized present position of the vehicle and the guide route is small, the corresponding control content is selected. This makes it possible to prevent the position or timing for the downshift, for example, from becoming different from that estimated from the actual road conditions. As a result, it is possible to prevent a feeling of physical disorder from being given to the driver making the corner control.

In the vehicle control system of the invention, moreover, the control content selecting means includes evaluating means for evaluating at least one of the present position detecting means and the present position recognizing means on the basis of both the present position of the vehicle recognized by the present position recognizing means and the road structures and conditions read out from the road structures and conditions storage means.

Moreover, the control content to inhibit corner control is set on the basis of the evaluation result by the evaluation means whereas an upper limit gear stage is set on the basis of the recommended gear stage determined by the recommended gear stage determining means, thereby to select the control content in which the upper limit gear stage is fed to the speed change processing means.

In this case, at least one of the present position detecting means and the present position recognizing means is evaluated so that the corner control is performed for a high reliability but is inhibited for a low reliability. Therefore, even when the deviation between the recognized present position of the vehicle and the guide route is small, the corner control can be inhibited. This makes it possible to prevent the position or timing for the downshift, for example, from becoming different from that estimated from the actual road conditions. As a result, it is possible to prevent a feeling of physical disorder from being given to the driver making the corner control.

What is claimed is:

1. A vehicle control system comprising:

a vehicle speed sensor for detecting a vehicle's speed;

road situation storage means for storing road structures and conditions;

recommended gear stage determining means for determining a recommended gear stage of an automatic transmission based on the vehicle's speed and the road structures and conditions;

present position detecting means for detecting a present position of the vehicle;

present position recognizing means for recognizing the present position of the vehicle, as detected by said present position detecting means;

control content selecting means for evaluating at least one of said present position detecting means and said present position recognizing means to select a control content based on the evaluation result; and speed change processing means for changing the vehicle's speed in accordance with the control content selected by said control content selecting means.

2. The vehicle control system according to claim 1, wherein said control content selecting means includes evaluating means for evaluating at least one of said present position detecting means and said present position recognizing means based on both the present position of the vehicle recognized by said present position recognizing means and the road structures and conditions read out from said road situation storage means, and wherein the control content to inhibit a corner control is set based on the evaluation result by said evaluating means whereas an upper limit gear stage is set based on the recommended gear stage determined by said recommended gear stage determining means, thereby to select the control content in which said upper limit gear stage is fed to said speed change processing means.

3. A recording medium stored with programs, comprising:

a program for determining a recommended gear stage of an automatic transmission based on a vehicle speed and road structures and conditions;

a program for detecting the present position of the vehicle;

a program for recognizing said present position;

a program for evaluating at least one of present position detecting means and present position recognizing means based on the recognized present position and the road structures and conditions; and a program for selecting a control content based on the evaluation.

* * * * *